United States Patent
Sunderasan et al.

(10) Patent No.: US 7,281,046 B1
(45) Date of Patent: Oct. 9, 2007

(54) APPLICATION PROGRAM INTERFACE FOR AUTOMATING HIGH SPEED NETWORK ACCESS ORDERING AND PROVISIONING PROCESSES

(75) Inventors: Vinu Sunderasan, Fremont, CA (US); Umesh Bellur, Sunnyvale, CA (US); Joel Yang, Mountain View, CA (US); Benjamin C. Cohen, San Jose, CA (US); Krishna S. Garimella, San Jose, CA (US)

(73) Assignee: Covad Communications Company, San Jose, CA (US)

( * ) Notice: Subject to any disclaimer, the term of this patent is extended or adjusted under 35 U.S.C. 154(b) by 906 days.

(21) Appl. No.: 09/608,501

(22) Filed: Jun. 30, 2000

(51) Int. Cl.
*G06F 15/16* (2006.01)
*G06F 15/173* (2006.01)
(52) U.S. Cl. .................. 709/228; 709/206; 709/226
(58) Field of Classification Search ............... 709/225, 709/226–227, 228, 246; 707/513; 705/35; 370/468
See application file for complete search history.

(56) References Cited

U.S. PATENT DOCUMENTS

| | | | |
|---|---|---|---|
| 5,416,833 A * | 5/1995 | Harper et al. .......... 379/201.05 |
| 5,528,677 A * | 6/1996 | Butler et al. ................ 379/196 |
| 5,883,946 A * | 3/1999 | Beck et al. ............ 379/201.12 |
| 5,987,233 A | 11/1999 | Humphrey |
| 6,006,259 A | 12/1999 | Adelman et al. |
| 6,012,098 A * | 1/2000 | Bayeh et al. ................ 709/246 |
| 6,028,867 A | 2/2000 | Rawson et al. |
| 6,176,710 B1 * | 1/2001 | Ewing et al. ............... 439/76.1 |
| 6,249,578 B1 * | 6/2001 | Gilles et al. ........... 379/207.13 |
| 6,286,049 B1 | 9/2001 | Rajakarunanayake et al. |
| 6,298,123 B1 * | 10/2001 | Nolting et al. ............... 379/111 |
| 6,347,307 B1 * | 2/2002 | Sandhu et al. ................. 705/35 |
| 6,351,770 B1 * | 2/2002 | Li et al. ...................... 709/225 |
| 6,366,584 B1 * | 4/2002 | Gulliford et al. ........... 370/403 |
| 6,388,990 B1 | 5/2002 | Wetzel |
| 6,459,702 B1 * | 10/2002 | Saaverda et al. ........... 370/422 |
| 6,463,079 B2 * | 10/2002 | Sundaresan et al. ........ 370/468 |
| 6,463,468 B1 * | 10/2002 | Buch et al. .................. 709/219 |

(Continued)

OTHER PUBLICATIONS www.businessweek.com:/1999/99_22/b3653111.htm?scriptFramed (Nov. 1, 1999).

(Continued)

*Primary Examiner*—Jason Cardone
*Assistant Examiner*—Thomas Duong
(74) *Attorney, Agent, or Firm*—Fenwick & West LLP

(57) ABSTRACT

An application program interface system and method for automating high speed network access ordering and provisioning processes, particularly involving business to business interactions, such as automating interactions between ISPs and ILEC/CLECs for xDSL service ordering and provisioning processes, are disclosed. The method for automating communications between service providers in connection with providing a high speed network access service generally comprises electronically receiving a request message relating to the high speed network access service from a service provider via a network, processing the request message from the service provider using a computer system to automatically generate a response message to the request message, and electronically transmitting the response message to the service provider via the network. The processing of the request message utilizes a predefined request document tag definition and the generating of the response message utilizes a predefined response document tag definition.

33 Claims, 10 Drawing Sheets

U.S. PATENT DOCUMENTS

| | | |
|---|---|---|
| 6,463,528 B1 | 10/2002 | Rajakarunanayake et al. |
| 6,507,856 B1 * | 1/2003 | Chen et al. .................. 715/513 |
| 6,507,870 B1 * | 1/2003 | Yokell et al. ................ 709/225 |
| 6,538,998 B1 | 3/2003 | Garimella |
| 6,580,718 B1 | 6/2003 | Chapman |
| 6,584,074 B1 | 6/2003 | Vasamsetti et al. |
| 6,587,883 B1 | 7/2003 | Rajakarunanayake |
| 6,594,695 B1 | 7/2003 | Vasamsetti et al. |
| 6,615,258 B1 * | 9/2003 | Barry et al. ................. 709/223 |
| 6,674,747 B1 * | 1/2004 | Lassaux et al. ............. 370/352 |
| 6,721,405 B1 * | 4/2004 | Nolting et al. .............. 379/133 |
| 6,728,238 B1 * | 4/2004 | Long et al. ................. 370/352 |
| 6,785,325 B1 * | 8/2004 | Liu et al. .................... 375/220 |
| 6,856,679 B2 * | 2/2005 | Pennington et al. ... 379/265.01 |
| 6,907,117 B2 * | 6/2005 | Gilles .................... 379/201.12 |
| 6,937,714 B2 * | 8/2005 | Gilles et al. ........... 379/221.01 |

OTHER PUBLICATIONS www.hns.com/products/snd/ro_es/resdiag.htm (Feb. 29, 2000).
www.hns.com/products/consol/hyb_es/hyb_es.htm (Jan. 3, 2001).
www.hns.com/products/consol/hyb_es/hesdiag.htm (Jan. 3, 2001).
Hughes Network Systems, "DirecPC Enterprise Edition," 1997.
Hughes Network Systems, "Receive Earth Station," 1998.
www.skycache.com/services/works.htm (Jan. 3, 2001).
www.ibeam.com/html/tech/tech_network.html (Jan. 3, 2001).

* cited by examiner

| Request Message Details |||
|---|---|---|
| Sub-Request Name | Second Level Elements | Third Level Elements |
| OrderEntryRequest | OrderEntryInformation | BackhaulCircuit<br>BillingCode<br>CompanyName<br>EndUserContact<br>EndUserSiteDetails<br>NetworkInformation<br>Notes<br>Service<br>ServiceAddress |
| OrderStatusRequest | ByActionDate<br>ByCurrentStatus<br>ByMileStone<br>ByNumber | DaysBack<br>FromDate<br>MonthsBack<br>ToDate |
| OrderSummaryRequest | ByActionDate<br>ByMilestone | DaysBack<br>FromDate<br>MonthsBack<br>ToDate |
| ServiceAvailabilityRequest | Address<br>VendorPreference | ZipCode<br>City<br>Email<br>State<br>StreetAddress1<br>TelephoneNumber |

FIG. 7

| Response Message Details | | |
|---|---|---|
| Sub-Request Name | Second Level Elements | Third Level Elements |
| OrderEntryResponse | EndUserCircuitNumber<br>OrderNumber<br>ResultCodeList | ResultCode |
| OrderStatusResponse | OrderStatusInformation<br>ResultCodeList | CentralOfficeCode<br>CLECCircuitNumber<br>InstallationSchedule<br>LastMilestone<br>OrderInformation<br>OrderReceived<br>Status<br>ResultCode |
| OrderSummaryResponse | OrderSummaryInformation<br>ResultCodeList | Category<br>Count<br>ResultCode |
| ServiceAvailabilityResponse | Address<br>AvailabilityResult<br>BackhaulCircuit<br>ResultCodeList | CentralOffice<br>CentralOfficeDistance<br>QualifiedServices<br>ResultCode |

FIG. 8

| Other Elements' Breakdown | | |
|---|---|---|
| Sub-Request Name | Second Level Elements | Third Level Elements |
| AvailabilityResult | CentralOffice<br>CentralOfficeDistance<br>PreferredServices<br>QualifiedServices | DSLService |
| DSLService | DownstreamLimit<br>MonthlyCost<br>ServiceAvailabilityDetails<br>ServiceBrandName<br>UpstreamLimit | AcceptOrdersDate<br>installOrdersDate |

APPLICATION PROGRAM INTERFACE FOR AUTOMATING HIGH SPEED NETWORK ACCESS ORDERING AND PROVISIONING PROCESSES

BACKGROUND OF THE INVENTION

1. Field of the Invention

The present invention relates generally to an application program interface for automating high speed network access ordering and provisioning processes. More specifically, an application program interface system and method for automating high speed network access ordering and provisioning processes, particularly involving business to business interactions, such as automating interactions between ISPs and ILEC/CLECs for xDSL service ordering and provisioning processes, are disclosed.

2. Description of Related Art

With the increasing popularity of the Internet and the increasing number of people who telecommute, more and more home and business computer users order and subscribe to high bandwidth or broadband network access services in order to access the Internet via Internet service providers (ISP) and/or corporate networks. The home and business computer end users are typically referred to as subscribers of such high bandwidth or broadband network access service. Such high bandwidth connection services may be provided by Integrated Services Digital Network (ISDN) providers, cable providers, wireless satellite providers, or digital subscriber line (DSL) providers, for example. Examples of DSL providers include incumbent local exchange carriers (ILECs) such as Pacific Bell (PacBell) of California and competitive local exchange carriers (CLECs) such as Covad Communications Group, Inc., assignee of the subject patent. ILECs and CLECs are collectively referred to as LECs herein.

In the case of providing DSL services to an end user subscriber, the end user subscriber typically orders the DSL service from an ISP and the ISP in turn orders the DSL service from a CLEC. Because the CLEC typically does not own but rather leases lines from an ILEC, the CLEC must also communicate with the ILEC to lease a line between the CLEC central office and the end user subscriber premise.

However, the process of ordering and provisioning high speed access services often requires the coordination of several tasks among several service provider business entities as well as the repeated use of the same or similar information by these several service provider business entities. In particular, the ordering and provisioning of DSL service, for example, may require the coordination of various tasks and information between the ISP and the CLEC. As a result, such ordering and provisioning of DSL services requires much interaction and communication between the ISP who offers the services to end users and the CLEC who acts as the wholesaler of the services. This process often involves a relatively large amount of manual data entry, tending to result in a tedious, time-consuming, inefficient, and error prone process. As is evident, while broadband network access services provide increases in network access speeds, the business to business communications for ordering and provisioning broadband network access services such as xDSL services remains a costly and inefficient process.

It would be thus desirable to provide a system and method for fulfilling broadband service orders that streamlines and improves the accuracy of the interactions and communications between CLECs and ISPs in the broadband, such as xDSL, service ordering and provisioning processes.

SUMMARY OF THE INVENTION

An application program interface system and method for automating high speed network access ordering and provisioning processes, particularly involving business to business interactions, such as automating interactions between ISPs and ILEC/CLECs for xDSL service ordering and provisioning processes, are disclosed. It should be appreciated that the present invention can be implemented in numerous ways, including as a process, an apparatus, a system, a device, a method, or a computer readable medium such as a computer readable storage medium or a computer network wherein program instructions are sent over optical or electronic communication lines. Several inventive embodiments of the present invention are described below.

The method for automating communications between service providers in connection with providing a high speed network access service generally comprises electronically receiving a request message relating to the high speed network access service from a service provider via a network, processing the request message from the service provider using a computer system to automatically generate a response message to the request message, and electronically transmitting the response message to the service provider via the network. Each of the request and response message generally conforms to a predefined request or response document tag definition. In addition, the processing of the request message utilizes the predefined request document tag definition and the generating of the response message utilizes the predefined response document tag definition. The request and the response are preferably encoded in extensible markup language (XML).

According to one preferred embodiment, the request and the response messages are associated with a type, the type one of service availability, order entry, order status, order summary, trouble ticket entry, trouble ticket status, and trouble ticket summary. The predefined response and request document tag definitions may be different from the different message types and the request and response messages conform to the document tag definitions for the corresponding type.

In one preferred embodiment, each predefined response and request document tag definition includes a message document header tag definition, a request or response message header tag definition, and a message body tag definition. The request or response message header tag definition includes a predefined sender tag definition and a recipient tag definition. The message body tag definition may include a type tag definition having a sub-request or a sub-response tag definition.

According to another preferred embodiment, the request message may contain one or more sub-requests. The response message is associated with the same type as the request and includes at least one sub-response of the same type as the corresponding sub-request.

In a preferred embodiment, the request message includes a request message identification code and the response message includes the same request message identification code. Each sub-request preferably has a sub-request identification code and the corresponding sub-response contains the same sub-request identification code.

These and other features and advantages of the present invention will be presented in more detail in the following detailed description and the accompanying figures which illustrate by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which:

FIGS. 7-9 are tables setting forth examples of request message details, response message details, and message details for other exemplary message types, respectively;

DESCRIPTION OF SPECIFIC EMBODIMENTS

An application program interface system and method for automating high speed network access ordering and provisioning processes, particularly involving business to business interactions, such as automating interactions between ISPs and ILEC/CLECs for xDSL service ordering and provisioning processes, are disclosed. The following description is presented to enable any person skilled in the art to make and use the invention. Descriptions of specific embodiments and applications are provided only as examples and various modifications will be readily apparent to those skilled in the art. The general principles defined herein may be applied to other embodiments and applications without departing from the spirit and scope of the invention. Thus, the present invention is to be accorded the widest scope encompassing numerous alternatives, modifications and equivalents consistent with the principles and features disclosed herein. For purpose of clarity, details relating to technical material that is known in the technical fields related to the invention have not been described in detail so as not to unnecessarily obscure the present invention. It is to be understood that although the xDSL order process is described herein for illustrative purposes, the application program interface may be implemented with any suitable high speed network access services.

Figure 1:
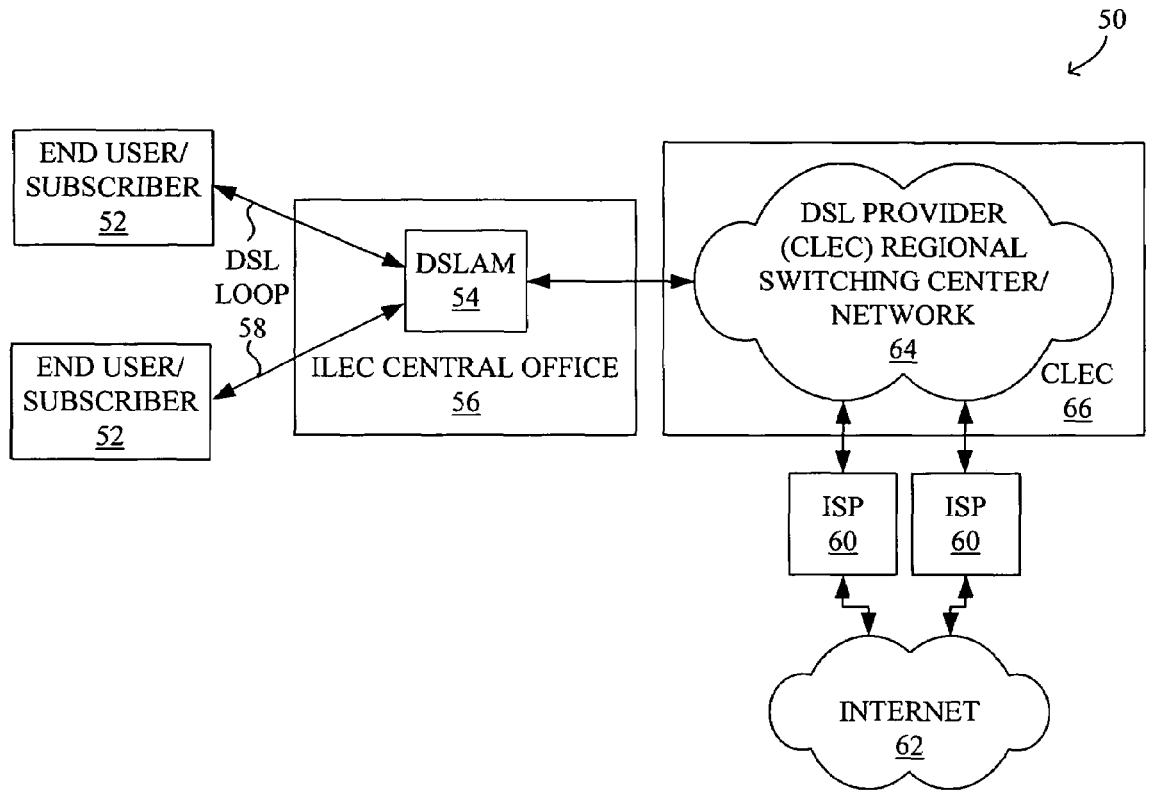
FIG. 1 is a block diagram illustrating a system for providing xDSL service to an end user subscriber.

FIG. 1 is a block diagram illustrating a system 50 for providing xDSL service to an end user subscriber 52. The end user subscriber 52 may be a home user, a small business, or a telecommuter, for example, to whom DSL service is to be delivered. As shown, the xDSL system 50 involves the end user subscriber 52 in communication with a DSL access multiplexer (DSLAM) 54 of a central office 56 of an ILEC via a DSL loop 58. The ILEC typically owns the twisted copper pair loop or last mile between the central office 56 and the end user subscriber premise 52. Generally, ILEC leases the loop as a unbundled network element (UNE) to the CLEC.

A DSL regional switching center or network 64 of a CLEC 66 is in communication with the Internet 62 via an ISP 60. The DSLAM 54 is also in communication with the DSL provider regional switching center 64 and multiplexes signals received from the switching center 64 to the end user subscriber 52.

Typically the CLEC 66 operates a regional or national network that connects various central offices with a CLEC backbone. The ISP 60 is in communication with the CLEC backbone by which the CLEC provides layer 2 DSL connection to end user subscriber 52 for the ISP 60. In addition, the ISP 60 provides layer 3 access to the Internet 62 to the end user subscriber 52. A permanent virtual circuit (PVC) may be established between a port of the DSLAM 54 to a port on a router of the ISP 60 to provide a communication path from the end user 52 to the ISP 60.

Figure 2:
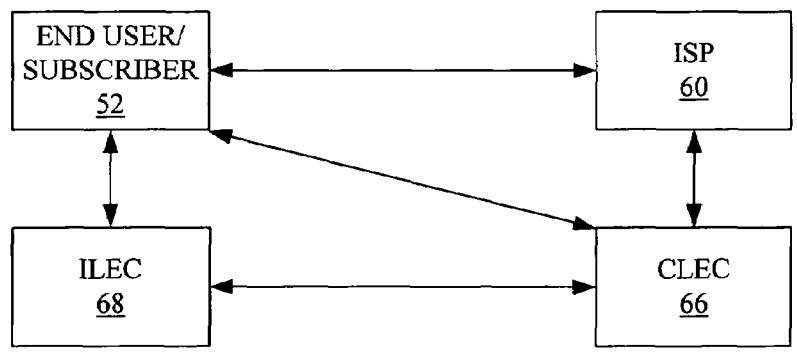
FIG. 2 is a block diagram illustrating interactions and communications among the end user subscriber, the ISP, the CLEC, and the ILEC in the xDSL service ordering and provisioning processes.

FIG. 2 is a block diagram illustrating interactions and communications among the end user subscriber 52, the ISP 60, the CLEC 66, and the ILEC 68 in the xDSL service ordering and provisioning processes. In particular, the end user subscriber 52 communicates with the ISP 60 to transmit a broadband Internet access service order to the ISP 60. The ISP 60 in turn communicates with the CLEC 66 to transmit a DSL service order to the CLEC 66. During the ordering process, rather than directly communicating with the end user subscriber 52, the CLEC 66 receives the necessary information regarding the end user and/or the desired service from the ISP 60.

The CLEC, in order to order a DSL loop between the central office and the end user subscriber premise, interacts and communicates with the ILEC 68 to lease the last mile DSL loop from the ILEC 68. The ILEC 68 may communicate with the end user subscriber 52 in order to install the DSL loop ordered by the CLEC 66, for example. Lastly, the CLEC may interact and communicate with the end user subscriber in order to install any necessary subscriber premise equipment, such as a modem, at the subscriber premise or location.

Figure 3:
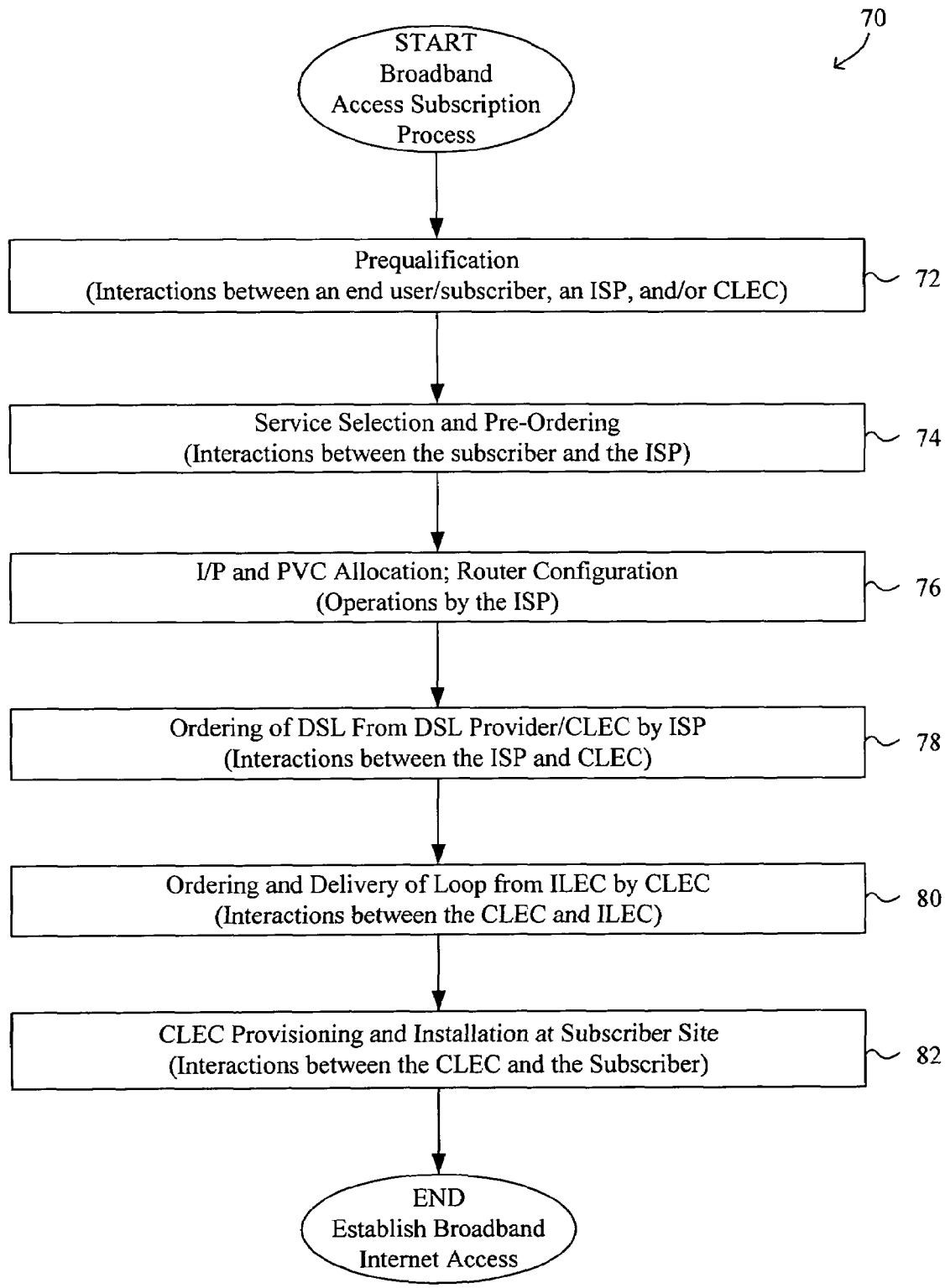
FIG. 3 is a flow chart illustrating a broadband access subscription process.

FIG. 3 is a flow chart illustrating a typical example of a broadband access subscription process 70. The process 70 begins with an end user subscriber interested in high-speed access to the Internet and ends with the subscriber being connected to the Internet via high-speed access.

At pre-qualification step 72, the end user subscriber expresses interest in high-speed access to the ISP and the ISP maps the end user subscriber installation location to a corresponding central office and determines the services for which the end user subscriber installation location qualifies based on various factors such as the distance of the end user subscriber's location to the corresponding central office and/or the services that the corresponding central office offers and provides, for example. Pre-qualification step 72 may additionally involve communications between the ISP and the CLEC in order for the ISP to map the end user subscriber installation location to the corresponding central office and/or to determine the services for which the end user subscriber installation location qualifies.

At service selection and pre-ordering step 74, the end user subscriber interacts and communicates with the ISP to select a service qualified in step 72 and places an order for the qualified service with the ISP. The ISP typically requires the end user subscriber to provide certain information such as the end user subscriber name and address, credit verification information, etc.

Next, step 76 of allocating I/P and PVC and configuring the ISP router is performed. In particular, the ISP selects a set of IP addresses to allocate to the end user subscriber. In addition, the ISP allocates the PVC that is to be utilized as the circuit from a port of the ISP router to the CLEC network.

At step 78, the ISP orders DSL service from CLEC. Specifically, the ISP places an order for DSL service with the CLEC and provides the information needed by the CLEC in order for the CLEC to provision the order. This step typically involves interactions and communications between the ISP and the CLEC.

At step 80, the CLEC orders and receives delivery of the last mile loop from the ILEC. This step typically involves interactions and communications between the CLEC and the ILEC. At step 82, the CLEC provisions its network with the requested PVC and installs service at the subscriber location. This step typically involves interactions and communications between the CLEC and the end user subscriber and may include a CLEC technician being physically present at the subscriber premise in order to install any necessary equipment, for example.

Figure 4:
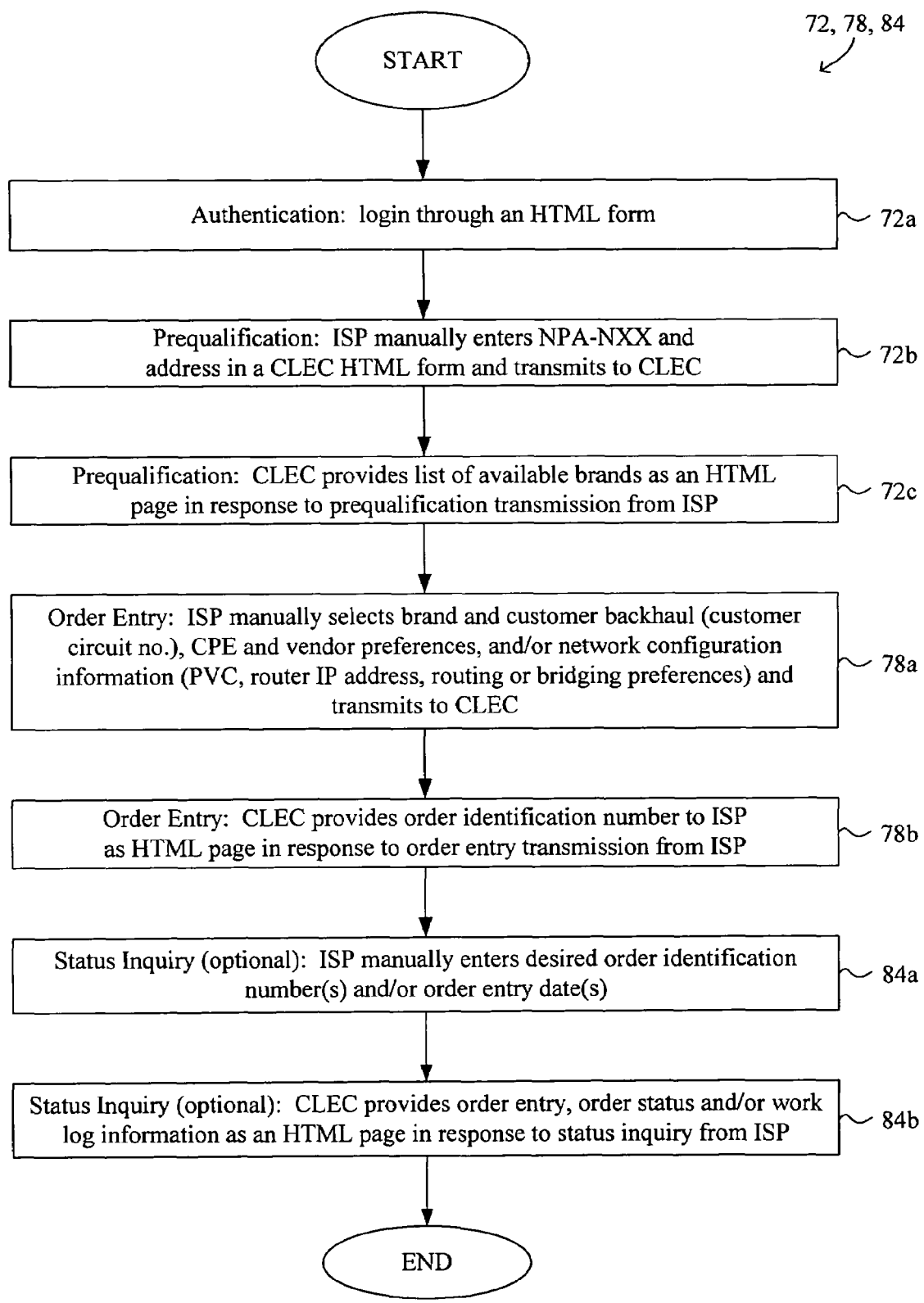
FIG. 4 is a flow chart illustrating the broadband access subscription process of FIG. 3 in more detail.

FIG. 4 is a flow chart illustrating portions of the broadband access subscription process of FIG. 3 in more detail. Specifically, FIG. 4 illustrates the pre-qualification step 72 and the service selection and pre-ordering step 74 as well as an optional status inquiry step 84 in more detail.

As noted, the pre-qualification step 72 may include communications between the ISP and the CLEC in order for the ISP to map the end user subscriber installation location to the corresponding central office and/or to determine the services for which the end user subscriber installation location qualifies. Such ISP-CLEC communications may occur via a network utilizing an HTML form, for example. In one preferred embodiment, the CLEC may authenticate the ISP via a login HTML form at step 72a in which the ISP enters login information such as username and password of the ISP utilizing an HTML form and transmits the information to the CLEC via a network such as the Internet. Next, at step 72b, the ISP manually enters at least portion of the telephone number, i.e., NPA-NXX (Numbering Plan Area—Local Exchange Prefix) and address of the end user subscriber desiring high bandwidth access in a CLEC HTML form and transmits such information to the CLEC via the Internet. At step 72c, the CLEC responds to the request from the ISP by providing a list of available services, if any, as an HTML page. The CLEC may determine the list of available services using the information provided by the ISP.

After pre-qualification and after the ISP obtains the desired service and/or other order information from the end user subscriber, the ISP orders the specific DSL service from the CLEC by providing relevant information to the CLEC at step 78. Specifically, at step 78a, the ISP manually selects the desired DSL service and customer backhaul or the customer circuit number, the CPE (customer premise equipment) and vendor preferences, and/or network configuration information and transmits such selections and information to the CLEC. The network configuration information may include information relating to the PVC, router IP address, routing or bridging preferences. At step 78b, the CLEC responds to the ISP by providing an order identification number. The CLEC may provide the order identification number in an HTML page, for example.

After the CLEC provides the order identification number at step 78, the ISP may optionally submit various status inquiries to the CLEC at optional status inquiry step 84. For example, at step 84a, the ISP may manually enter the order identification number(s) and/or order entry date(s) for which the ISP desires status information. At step 84b, the CLEC may respond to the ISP's status inquiry by providing order entry, order status, and/or work log information to the ISP such as in the form of an HTML page.

Figure 5:
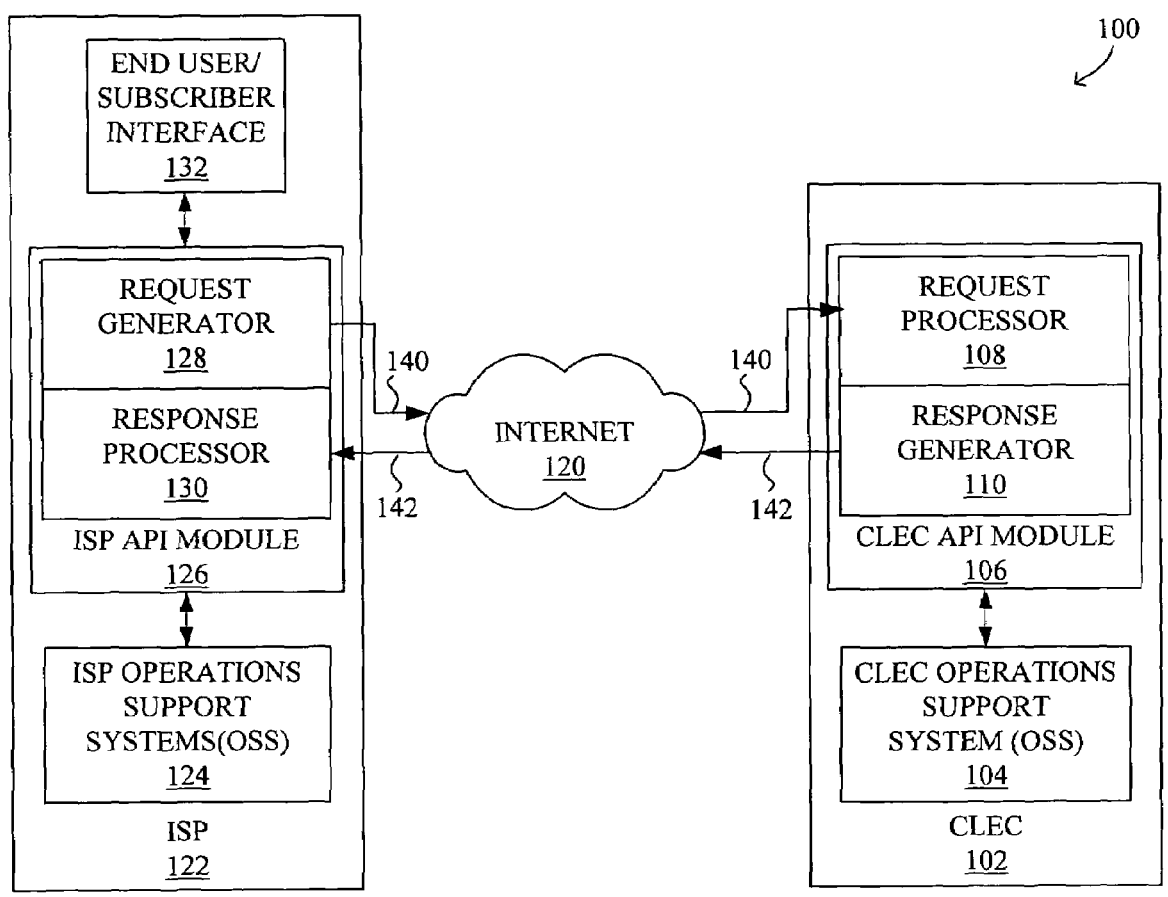
FIG. 5 is a block diagram illustrating an exemplary application program interface system for automating communications between ISPs and ILECs in connection with xDSL service ordering and provisioning processes.

As is evident, the above-described ordering and provisioning process for high speed network access can be tedious, time-consuming, inefficient, and may allow for errors at various stages as various information is entered manually. FIG. 5 is a block diagram illustrating an exemplary application program interface (API) system 100 for automating communications between ISPs and ILECs in connection with ordering and provisioning processes for broadband network access service such as xDSL service.

The application program interface system 100 generally allows the automated communications between a CLEC 102 and an ISP via a network such as an intranet, extranet, or the Internet 120. The CLEC 102 generally includes a CLEC operational support system (OSS) 104 and a CLEC API module 106. The CLEC API module 106 may include a request processor 108 and a response generator 110. Similarly, the ISP 122 generally includes an ISP OSS 124, an ISP API module 126, and an end user subscriber interface 132. The ISP API module 126 may include a request generator 128 and a response processor 130. The CLEC API module 106 is in communication with the ISP API module 126 via the Internet 120. In essence, the API system 100 allows the CLEC OSS 104 to communicate with the ISP OSS 124 and vice versa.

The CLEC API module 106 is in communication with the CLEC OSS 104 in order to exchange data and information therebetween. The CLEC OSS 104 processes orders and various other requests received by the CLEC API module 106 such that the CLEC API module 106 may generate responses to ISP requests. Similarly, the ISP API module 126 is in communication with the ISP OSS 124 in order to exchange data and information therebetween. The CLEC API module 106 may include a template mechanism or engine to transmit data in one format or another, e.g. XML, HTML, CSV (comma separated values), etc. The template mechanism allows the generation of multiple look and feel.

The ISP end user subscriber interface 132 may communicate directly or indirectly with the ISP API module 126 and/or the ISP OSS module 124. In particular, the ISP end user subscriber interface 132 may interact with the ISP API module 126 using any suitable interface, such as a CGI (Common Gateway Interface) or a servlet interface. The ISP API module 126 collects end user subscriber requests and may interact with the ISP OSS 124. Although not shown, the CLEC 102 and/or the ISP 122 may include additional modules, components, and/or interfaces for facilitating communications with the ILEC, the end user subscriber, and/or any other entity.

The ISP request generator 128 may generate and transmit a request message 140 to the CLEC request processor 108. In response to the ISP request 140, the CLEC API module 106 may communicate with the CLEC OSS 104 in order to obtain or access information necessary in responding to the ISP request 140. For example, the CLEC API module 106 may request the relevant information from the CLEC OSS 104 and/or forward the request to the CLEC OSS 102 for the CLEC OSS 102 to process and analyze.

The CLEC response generator 110 then generates a response by, for example, encapsulating the relevant information obtained from the CLEC OSS 104 in a response message 142 and transmits the response message 142 to the ISP API module 126 via the Internet 120. The ISP response processor 130 may process the response message 142 from the CLEC and forward information to the ISP OSS 124 and/or the end user subscriber via the end user subscriber interface 132.

Preferably, the CLEC API module 106 and the ISP API module 126 utilize XML (eXtensible Markup Language). However, any other suitable language, such as HTML (HyperText Markup Language), may be utilized. XML is preferred over other languages at least in part because it allows more flexibility and complexity of presentation than HTML and is not limited to Web publishing. In addition, XML is easily extensible and can be augmented without corrupting existing data representation. As such, the use of XML enhances time-to-market while preserving existing infrastructure investments. XML has emerged as the de-facto standard in description of complex hierarchical streams of data. In the broadband network access ordering and provisioning API system 100, preferably all data interchanges, including communications of exceptions and/or error conditions, are done using XML. In the present exemplary xDSL ordering and processing system using XML, an xDSL-specific XML namespace for the content representation is referred to herein as XDML (eXtensible DSL Markup Language).

In addition, in order for the CLEC 102 and the ISP 122 to communicate, the data or messages containing the data transmitted therebetween should conform to predefined DTDs (Document Tag Definition or Document Type Definition). DTDs essentially define standard data formats and are preferably provided by the CLEC such as at a well-known website via a publicly viewable specification. Such standardized formats allows both the ISP and the CLEC to electronically generate and process the requests and responses automatically and to develop their own interfaces with internal and/or external systems. Thus, all requests 140 from the ISP 122 to the CLEC 102 and the responses 142 from the CLEC 102 to the ISP 122 generally conform to the DTDs. XDML as well as DTDs will be described in more detail below.

The ISP API module 126 performs various functions. For example, the ISP API module 126 may perform order data collection in order to collect data about the end user subscriber by interfacing with other ISP internal systems such as the ISP OSS 124 and/or by directly interfacing with the end user subscriber via the end user subscriber interface 132. The order data collection functionality may additionally or alternatively be implemented as an interface to a database in which data about the end user subscribers reside.

The ISP API module 126 may also perform request generation and such function is typically performed by the request generator 128. As noted, the request 140 generated is preferably in XML format, or more specifically, in the XDML format. Furthermore, the request 140 should conform to a specific DTD. The ISP API module 126 preferably utilizes the corresponding DTD to validate the XML request message or document before the message is transmitted to the CLEC 102.

The ISP API module 126 may also process responses received by the response processor 130. The responses processing typically involves parsing the XML response using a standard XML parser and handling the response. The response format preferably also conforms to the corresponding response DTD.

The ISP 122 and the CLEC 102 may establish a secure sockets layer (SSL) using HTTPS as the transport protocol for transmission of data over the network such as the Internet 120. SSL is known in the art and generally includes utilizing a private key to encrypt data that is transferred over the SSL connection. SSL is often utilized to obtain confidential information. Alternatively or additionally, a Secure HTTP (S-HTTP) may be utilized to transmit data securely via the Internet or the World Wide Web. S-HTTP is also known in the art and is generally designed to transmit individual messages securely. An SSL connection and/or S-HTTP facilitate in protecting the confidentiality of the dynamically generated URL that may contain end user profile data.

As is evident, although the CLEC API module 106 and the ISP API module 126 interact and communicate with each other, such as through XML data streams, the specific implementations of the CLEC API module 106 and the ISP API module 126 can be mutually independent. More specifically, each of the CLEC API module 106 and the ISP API module 126 may be implemented in any suitable manner, such as using C, Java, or Perl programming language and/or on any suitable operating system such as Unix, NT, or Linux, for example.

The data comprises name or attribute/value pairs and is preferably transmitted as a data stream between the ISP API module 126 and the CLEC API module 106. Typically, this is achieved by performing a POST on a URL. The POST method of transmitting data is known in the art and typically involves transmitting attribute/value pairs from a client to a server through a TCP stream. A script of the server may then read the attribute/value pairs from a standard input, for example. Although not preferred, the data may alternatively be transmitted between the ISP API module 126 and the CLEC API module 106 as URL encoded data such as by performing a GET command on a URL. The GET method of transmitting data is also known in the art and typically involves transmitting attribute/value pairs from a client to a server by appending the attribute/value pairs to the URL after a special character such as '?'. Regardless of the method utilized to transmit attribute/value pairs, the URL is preferably for an SSL service that listens for requests on a secure port, such as port 443 the default SSL port.

Figure 6:
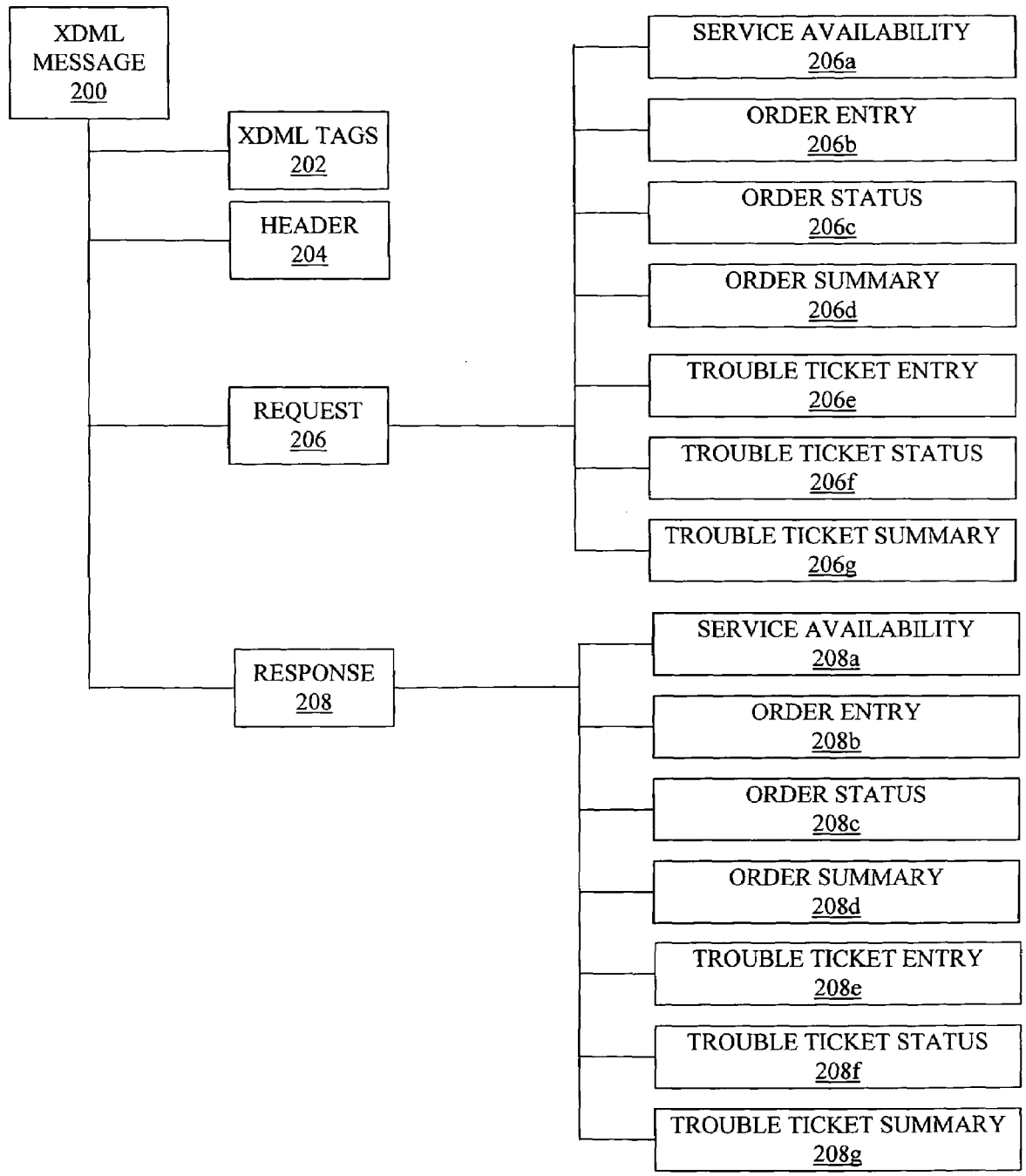
FIG. 6 is a block diagram illustrating an example of an XDML element tree for an XDML message.

As noted above, the transmission of data between the ISP and the CLEC API modules preferably utilizes XML and more specifically XDML. FIG. 6 is a block diagram illustrating an example of an XDML element tree for an XDML message 200. As shown, the XDML message 200 may contain one or more XDML tags 202, a header 204, and one of a request 206 or response 208. Each request or response message 200 is preferably associated with a type. Examples of request message types may include request for service availability 206a, order entry 206b, order status 206c, order summary 206d, trouble ticket entry 206e, trouble ticket status 206f, and trouble ticket summary 206g. Alternatively, if the message 200 is a response 208 to a request message, the response is preferably associated with a type that is the same as the request type of the corresponding request message.

As mentioned above, predefined DTDs specify and define data content and data representations for the API system. DTDs define standard data formats to allow the ISP and the CLEC to electronically and automatically generate and process the requests and responses without human assistance or intervention and to allow each business entity to develop its own interfaces for interfacing with internal and/or external systems. All requests from the ISP to the CLEC and the responses from the CLEC to the ISP should conform to the DTDs. The ISP and the CLEC can utilize the API system and method to allow customization of information from the other entity such that the neither entity is completely dependent upon the other entity's data presentation format.

The API system and method enable both the ISP and the CLEC to scale businesses rapidly, improve operational efficiency by reducing order entry and management costs and difficulty. The API system and method also provide the ISP with maximal flexibility to customize service and order processes for its end users and/or affiliates and to provide a software platform for future services ordering. The ISP can create extensions to its own internal systems to interface with the CLEC OSS.

The API system and method allows the ISP to also batch orders in a single request and to submit such batch requests to the CLEC. Thus, the ISP can process orders in a group on a periodic or regular basis such as daily, semi-daily, or hourly. In addition, the API system and method can also be extended by the ISP so that it may perform its own validation and screening of service orders from end user subscribers prior to qualification of such service orders by the CLEC.

FIGS. 7-9 are tables setting forth examples of request message type details, response message type details, and message details for other exemplary request and response message types, respectively. For each request and sub-request type, FIGS. 7-9 provide examples of corresponding second level elements or parameter definitions of the sub-request as well as lower or third level (more detailed) elements or parameter definitions that expand upon the second level elements.

For example, as shown in FIG. 7, a order entry request type may include order entry information such as backhaul circuit, billing code, company name, end user contact, end user site details, network information, notes, services, and/or service address information fields. The order entry response for a corresponding order entry request as shown in FIG. 8 may include end user circuit number, order number, and/or result or transaction code list. Further, as shown in FIG. 8, the second level elements and the third level elements for each response message type include a result code list and a result code, respectively. FIG. 9 provides two additional examples of request and response message types: availability result and DSL service.

Figure 10:
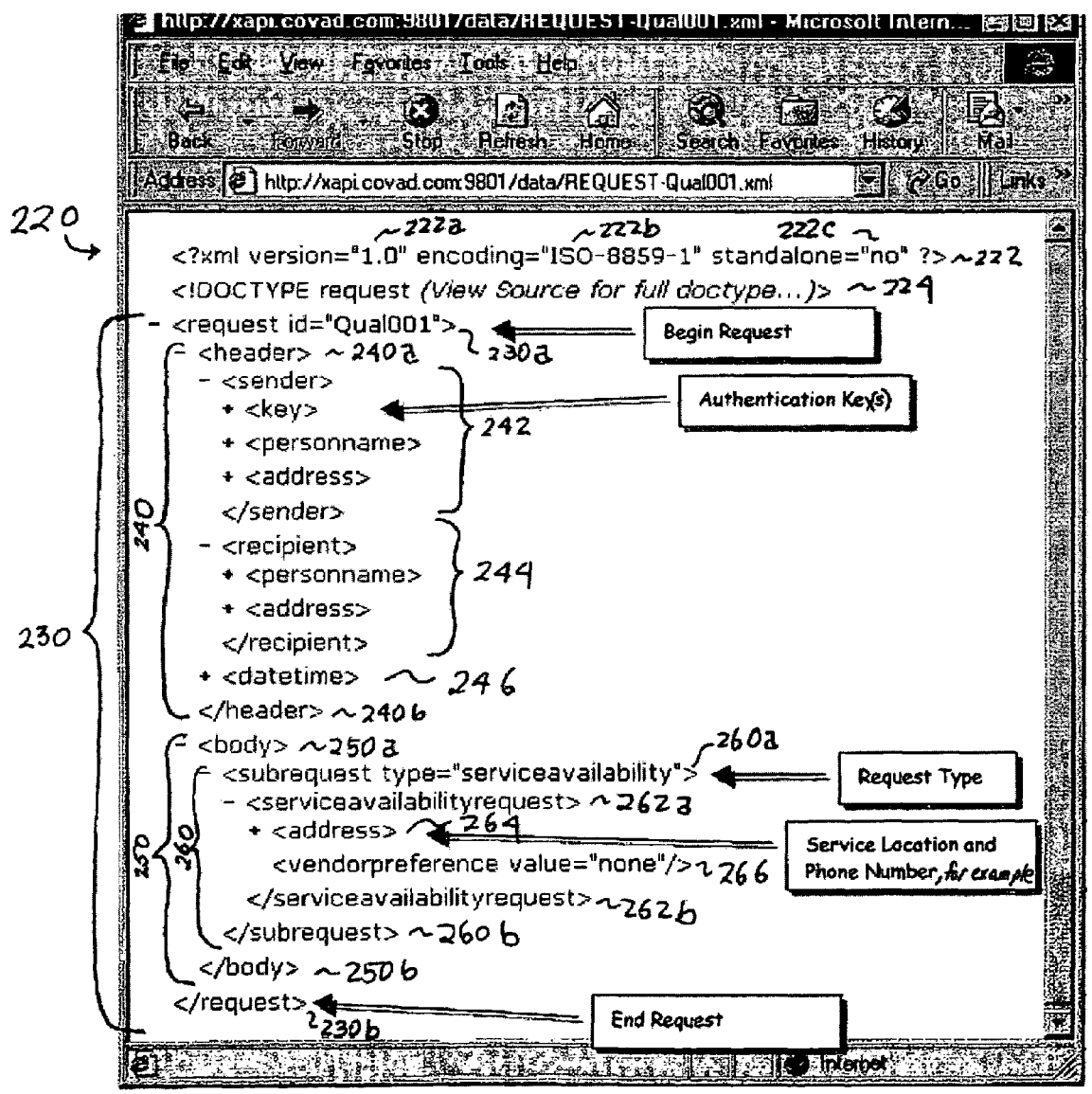
FIG. 10 illustrates portions of an exemplary XDML service availability request.
Figure 11:
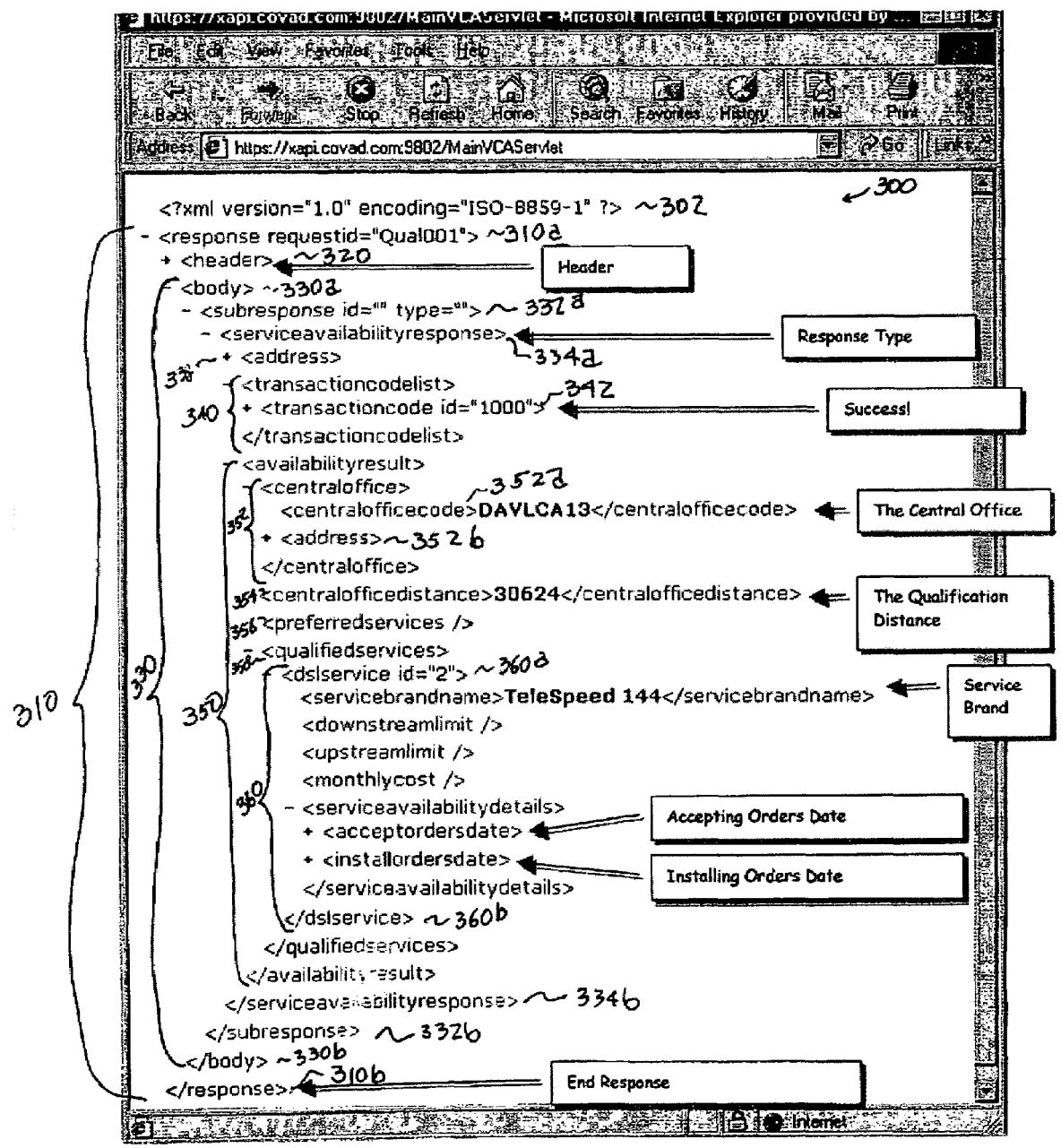
FIG. 11 illustrates portions of an exemplary XDML service availability response.

FIGS. 10 and 11 illustrate portions of an exemplary XDML service availability request 220 and an exemplary XDML service availability response 300, respectively. It is noted that certain elements or nodes in FIGS. 10 and 11 are denoted with "+" to indicate that the node is collapsed for the purposes of clarity. In addition, certain notes are denoted with "−" to indicate that the node is expanded. An example of a complete set of format definitions and samples may be found at http://xlink.covad.com, the contents of which is incorporated herein by reference in its entirety as of the filing date of the subject patent application.

Each XDML request or response message is typically encapsulated within <xdml> </xdml> tags (not shown). Optionally, only one of a request or a response type is encapsulated in each XDML message. However, each request or response preferably can contain one or more sub-requests or sub-responses. The sub-requests and the sub-responses need not be of the same type as the corresponding request or response. For example, a service availability request may contain multiple service availability sub-requests but preferably does not contain other types of requests such as an order entry request. Each sub-request generally has an identification code assigned that is unique among all sub-requests in the particular message. Each sub-response is preferably generated in response to a particular sub-request and thus correspond to that specific sub-request. In addition, each sub-response has an identification code assigned that corresponds to and is typically the same as the identification of the corresponding sub-request. Further, each response and sub-response generally contains a transaction identification code that is a unique message identification code.

An XDML tag is the encapsulating tag for the entire XDML message and optionally appears below obligatory XML tags that denote the XML version number and/or encoding methodology. The XDML tag may include authentication login and password, transactions identification code, and/or a time stamp for the originating time of the message such as in ISO 8601 format. The XDML tag may be followed by a header that may be useful for information used for customization purposes although such header is optional. Each of the XDML service availability request and response 220, 300 will be described in more detail below.

In the exemplary XDML service availability request message 220 shown in FIG. 10, the XDML request message 220 contains an XML header 222, a message or document type tag 224, and a request 230. The XML header 222 shown includes an XML version number 222a, an encoding version or method 222b, and a value of the "standalone" parameter 222c. A value of "yes" for the "standalone" parameter 222c indicates that the XML message file 220 need not be validated while a value of "no" indicates that the XML message file 220 needs to be validated. The XML header 222 may be followed by a tag 224 that indicates whether the message is a request or a response.

The request 230 of the request message 220 is contained within or delineated by <request>, </request> tags 230a, 230b. The <request> tag 230a designates the beginning or the request 230 and typically includes a request transaction identification code such as "Qua1001" that is optionally generated by a requester such as the ISP. The request transaction identification code may be utilized by the ISP for internal tracking for example. The request 230 typically includes a request header 240 and a request body 250.

The request header 240 is contained within or delineated by <header>, </header> tags 240a, 240b. The request header 240 may contain such common header information that applies to all the sub-requests contained in the request message 220. For example, the service availability request header 240 may include information about the sender and recipient 242, 244 of the XML message as well as the date and time 246 of the request message generation. For example, the sender information 242 may include components such as key(s) for the sender delineated by <key>, </key> tags, personname of the sender delineated by <personname>, </personname> tags, and/or sender address delineated by <address>, </address> tags. As additional example, the recipient information 244 may include components such as personname of the recipient delineated by <personname>, </personname> tags and/or recipient address delineated by <address>, </address> tags.

The service availability request body 250 is delineated by <body>, </body> tags 250a, 250b and may contain one or more sub-requests 260 each delineated by <subrequest>, </subrequest> tags 260a, 260b. It is to be understood that although the request message 220 shown contains only one sub-request 260, any suitable number of sub-requests, preferably of the same request type may be included in a request message. The service availability <subrequest> tag 260*a* preferably specifies the request type such as "serviceavailability." The service availability request may be further delineated by <serviceavailabilityrequest>, </serviceavailabilityrequest> tags 262*a*, 262*b*. The body of the service availability request may include fields such as address 264 and vendor preference 266. The address 264 data field may provide the service location and/or phone number of the end user subscriber for which service is requested. Such information may include street address, city, state, zip code, telephone number (specifically, the 3-digit area code or NPA, the 3-digit exchange numbers or NXX, as well as the last remaining 4 digits), facsimile number, and/or e-mail address of the end user subscriber.

An exemplary XDML service availability response message 300 generated in response to the XDML service availability request described above is shown in FIG. 11. The XDML response message 300 contains an XML header 302 and a response 310. The XML header 302 shown includes an XML version number 302*a* and an encoding version or method 302*b*.

The response 310 is delineated by <response>, </response> tags 310*a*, 310*b* and may include a response header 320 and a response body 330. The response header 320 may contain common header information that applies to all the sub-response contained in the response message 300. In particular, the response header 320 may contain information similar to the request header of the request message.

The response body 330 The service availability response body 330 is delineated by <body>, </body> tags 330*a*, 330*b* and may contain one or more sub-responses each delineated by <subresponse>, </subresponse> tags 332*a*, 332*b*. It is to be understood that although the response message 300 shown contains only one sub-response 332, any suitable number of sub-responses, preferably of the same response type, may be included in a response message. In addition, the maximum number of sub-responses would typically be the number of sub-requests of the corresponding request message. The service availability <subresponse> tag 332*a* preferably specifies the response identification code specified by the request message as well as the response type such as "serviceavailability" corresponding to that of the request message.

The service availability response may be further delineated by <serviceavailabilityresponse>, </serviceavailabilityresponse> tags 334*a*, 334*b*. The body of the service availability response may include fields such as address 338, transaction code list 340, and service availability result 350. The address data field 338 may contain same or similar data as the address data field of the service availability request, namely, the service location and/or phone number of the end user subscriber for which service was requested. The transaction code list 340 typically contains at least one transaction identification code 342. For example, the transaction code list 340 may contain multiple transaction codes such as with multiple error conditions or multiple request validation errors.

The service availability result 350 may contain information relating to a central office 352 such as the central office code 352*a* and the central office address 352*b*, central office distance 354 from the service subscriber, preferred services 356 of the service subscriber, and/or qualified services list 358 for the service subscriber, for example. Each qualified service 360 of the qualified services list 358 is preferably delineated by tags such as <dslservice>, </dslservice> tags 360*a*, 360*b* where the <dslservice> tag 360*a* may include the DSL service identification code and/or DSL service type.

For each DSL service, the response message 300 may include data fields such as service brand name, downstream data speed limit, upstream data speed limit, monthly cost, installation and/or equipment cost (not shown), and service availability details such as the date that the CLEC begins to accept orders for the corresponding service and/or installation order date.

As is evident, any suitable set of data fields or information parameters that may include any of the exemplary fields and/or any other fields may be submitted in each sub-request. Similarly, any suitable set of information parameters that may include any of the exemplary fields and/or any other fields may be submitted in each sub-response. Preferably, the set of data fields for the request is sufficient for the recipient of the request, such as the CLEC, to process the request and generate a desired response. Similarly, the set of data fields for the response preferably contains all the data desired by the recipient of the response, such as the ISP.

Figure 12:
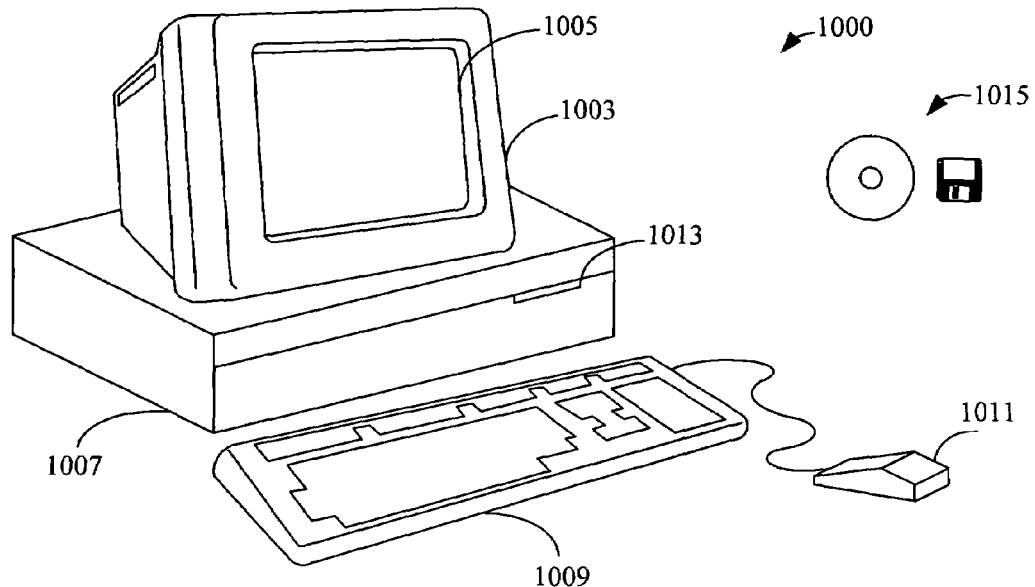
FIG. 12 is a schematic illustrating an example of a computer system that can be utilized with the various embodiments of method and processing described herein.
Figure 13:
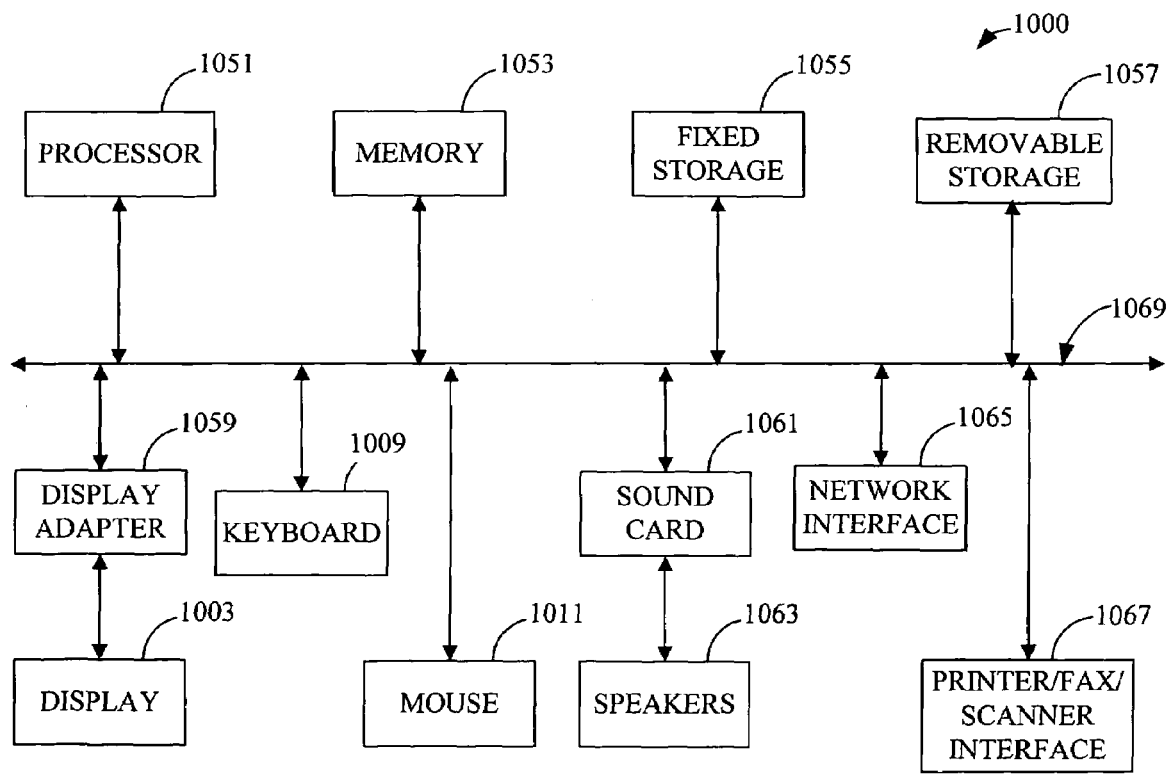
FIG. 13 illustrates a system block diagram of the computer system of FIG. 12.

FIGS. 12 and 13 is an illustrative schematic and a block diagram, respectively, of an example of a general purpose computer system 1000 suitable for executing software programs that implement the methods and processes described herein. The architecture and configuration of the computer system 1000 shown and described herein are merely illustrative and other computer system architectures and configurations may also be utilized. The computer system 1000 may be illustrative of the computer system of the service provider, the client, or the end-user or customer, for example.

The illustrative computer system 1000 includes a display 1003, a screen 1005, a cabinet 1007, a keyboard 1009, and a mouse 1011. The mouse 1011 can have one or more buttons for interacting with a GUI (graphical user interface) that may be displayed on the screen 1005. The cabinet 1007 typically house one or more drives to read a computer readable storage medium 1015, system memory 1053, and a hard drive 1055, any combination of which can be utilized to store and/or retrieve software programs incorporating computer codes that implement the methods and processes described herein and/or data for use with the software programs, for example. Examples of computer or program code include machine code, as produced, for example, by a compiler, or files containing higher level code that may be executed using an interpreter.

Computer readable media may store program code for performing various computer-implemented operations and may be encompassed as computer storage products. Although a CD-ROM and a floppy disk 1015 are shown as exemplary computer readable storage media readable by a corresponding CD-ROM or floppy disk drive 1013, any other combination of computer readable storage media can be utilized. Computer readable medium typically refers to any data storage device that can store data readable by a computer system. Examples of computer readable storage media include tape, flash memory, system memory, and hard drive may alternatively or additionally be utilized. Computer readable storage media may be categorized as magnetic media such as hard disks, floppy disks, and magnetic tape; optical media such as CD-ROM disks; magneto-optical media such as floptical disks; and specially configured hardware devices such as application-specific integrated circuits (ASICs), programmable logic devices (PLDs), and ROM and RAM devices. Further, computer readable storage medium may also encompass data signals embodied in a carrier wave, such as the data signals embodied in a carrier wave carried in a network. Such a network may be an intranet within a corporate or other environment, the Internet, or any network of a plurality of coupled computers such that the computer readable code may be stored and executed in a distributed fashion.

Computer system 1000 comprises various subsystems. The subsystems of the computer system 1000 may generally include a microprocessor 1051, system memory 1053, fixed storage 1055 (such as a hard drive), removable storage 1057 (such as a CD-ROM drive), display adapter 1059, sound card 1061, transducers 1063 (such as speakers and microphones), network interface 1065, and/or scanner interface 1067.

The microprocessor subsystem 1051 is also referred to as a CPU (central processing unit). The CPU 1051 can be implemented by a single-chip processor or by multiple processors. The CPU 1051 is a general purpose digital processor which controls the operation of the computer system 1000. Using instructions retrieved from memory, the CPU 1051 controls the reception and manipulation of input data as well as the output and display of data on output devices.

The network interface 1065 allows CPU 1051 to be coupled to another computer, computer network, or telecommunications network using a network connection. The CPU 1051 may receive and/or send information via the network interface 1065. Such information may include data objects, program instruction, output information destined to another network. An interface card or similar device and appropriate software implemented by CPU 1051 can be used to connect the computer system 1000 to an external network and transfer data according to standard protocols. In other words, methods and processes described herein may be executed solely upon CPU 1051 and/or may be performed across a network such as the Internet, intranet networks, or LANs (local area networks), in conjunction with a remote CPU that shares a portion of the processing. Additional mass storage devices (not shown) may also be connected to CPU 1051 via the network interface 1065.

The subsystems described herein are merely illustrative of the subsystems of a typical computer system and any other suitable combination of subsystems may be implemented and utilized. For example, another computer system may also include a cache memory and/or additional processors 1051, such as in a multi-processor computer system.

The computer system 1000 also includes a system bus 1069. However, the specific buses shown are merely illustrative of any interconnection scheme serving to link the various subsystems. For example, a local bus can be utilized to connect the central processor to the system memory and display adapter.

One embodiment of the system and method for automating interactions and communications between service providers for broadband network services, particularly between the ISP and the CLEC for xDSL services, is at least in part described in "Automating the ISP to CLEC Interaction of the xDSL Supply Chain," dated Aug. 15, 1999, Contribution Paper for the Network Management and Operations Working Group of the ADSL Forum, the entirety of which is incorporated by reference herein.

While the preferred embodiments of the present invention are described and illustrated herein, it will be appreciated that they are merely illustrative and that modifications can be made to these embodiments without departing from the spirit and scope of the invention. Thus, the invention is intended to be defined only in terms of the following claims.

What is claimed is:

1. A computer-implemented method for automating communications between service providers in connection with providing a high speed network access service, comprising:

electronically receiving a request message relating to the high speed network access service, the high speed network access service comprises digital subscriber line technology, from a first service provider by a second service provider of the high speed network access service via a network, the first and second service providers cooperating to provide high speed network access service to an end subscriber, the cooperating includes passing high speed network data destined to or originating from the end subscriber, the first and second service providers respectively is one from a group consisting of: (i) a competitive local exchange carrier (CLEC) and an incumbent local exchange carrier (ILEC); (ii) an ILEC and a CLEC; (iii) an internet service provider (ISP) and a CLEC; or (iv) a CLEC and an ISP;

processing the request message from the first service provider automatically upon the receiving using a computer system to automatically generate a response message to the request message by the second service provider; and electronically transmitting the response message from the second service provider to the first service provider via the network automatically upon completion of the processing, wherein the processing of the request message by the second service provider utilizes a predefined request document tag definition and the generating of the response message by the second service provider utilizes a predefined response document tag definition.

2. The method for automating communications between service providers in connection with providing the high speed network access service of claim 1, wherein the processing of the request message determines a type with which the request message is associated, the type is selected from the group consisting of service availability, DSL service, order entry, order status, order summary, trouble ticket entry, trouble ticket status, and trouble ticket summary.

3. The method for automating communications between service providers in connection with providing the high speed network access service of claim 2, wherein the processing of the request message utilizes the predefined request document tag definition corresponding to the request message type.

4. The method for automating communications between service providers in connection with providing the high speed network access service of claim 2, wherein the generating of the response message generates the response message in conformity to the predefined response document tag definition corresponding to the response message type and associates the response message with the request message type.

5. The method for automating communications between service providers in connection with providing the high speed network access service of claim 2, wherein the processing of the request message includes determining from the request message values for request parameters corresponding to the message type.

6. The method for automating communications between service providers in connection with providing the high speed network access service of claim 5, wherein the generating of the response message includes associating the response message with said message type and incorporating into the response message values for response parameters corresponding to said message type.

7. The method for automating communications between service providers in connection with providing the high speed network access service of claim 1, wherein, where the request message includes at least one sub-request, the generating of the response message includes generating the response message with at least one sub-response, each sub-response corresponding to one of at least one sub-request.

8. The method for automating communications between service providers in connection with providing the high speed network access service of claim 7, wherein the generating of the response message includes associating each sub-response with an identification code associated with the corresponding sub-request.

9. The method for automating communications between service providers in connection with providing the high speed network access service of claim 1, wherein the processing of the request message includes decoding the request message from extensible markup language (XML) and the generating of the response message includes encoding the response messages in XML.

10. The method for automating communications between service providers in connection with providing the high speed network access service of claim 1, wherein the request message is associated with a request message identification code and the response message is associated with the request message identification code.

11. The method for automating communications between service providers in connection with providing the high speed network access service of claim 1, wherein each predefined response and request document tag definition is associated with a message document header tag definition, corresponding one of a request and response message header tag definition and a message body tag definition.

12. The method for automating communications between service providers in connection with providing the high speed network access service of claim 11, wherein the corresponding one of a request and response message header tag definition is associated with a predefined sender tag definition and a recipient tag definition.

13. The method for automating communications between service providers in connection with providing the high speed network access service of claim 11, wherein the message body tag definition is associated with a type tag definition having a corresponding one of a sub-request and a sub-response tag definition.

14. A computer-implemented system for automating communications between service providers in connection with providing a high speed network access service, comprising:

a request processor adapted to electronically receive and process a request message relating to the high speed network access service, the high speed network access service comprises digital subscriber line technology, received from a first service provider by a second service provider of the high speed network access service via a network, the first and second service providers cooperating to provide high speed network access service to an end subscriber, the cooperating includes passing high speed network data destined to or originating from the end subscriber, the first and second service providers respectively is one from a group consisting of: (i) a competitive local exchange carrier (CLEC) and an incumbent local exchange carrier (ILEC); (ii) an ILEC and a CLEC; (iii) an internet service provider (ISP) and a CLEC; or (iv) a CLEC and an ISP;

a response generator of the second service provider adapted to automatically generate the response message in response to the request message from the first service provider; and an operations support system of the second service provider adapted to process data from the request message from the first service provider to facilitate the response generator in generating the response message for transmission to the first service provider via the network automatically upon generating of the response message, wherein the request processor of the second service provider processes the request message according to a predefined request document tag definition and the response generator of the second service provider generates the response message in conformity with a predefined response document tag definition.

15. The system for automating communications between service providers in connection with providing the high speed network access service of claim 14, wherein the request process determines a type associated with the request message, the type being selected from the group consisting of service availability, DSL service, order entry, order status, order summary, trouble ticket entry, trouble ticket status, and trouble ticket summary.

16. The system for automating communications between service providers in connection with providing the high speed network access service of claim 15, wherein the request processor utilizes the predefined request document tag definition corresponding to the request message type in processing the request message.

17. The system for automating communications between service providers in connection with providing the high speed network access service of claim 15, wherein the response generator generates the response message in conformity with the predefined response document tag definition corresponding to the response message type and associates the response message with the request message type.

18. The system for automating communications between service providers in connection with providing the high speed network access service of claim 15, wherein the request processor is adapted to determine from the request message values for request parameters corresponding to the message type.

19. The system for automating communications between service providers in connection with providing the high speed network access service of claim 18, wherein the response generator is adapted to associate the response message with said message type and to incorporate into the response message values for response parameters corresponding to said message type.

20. The system for automating communications between service providers in connection with providing the high speed network access service of claim 14, wherein the request processor is adapted to decode the request message from extensible markup language (XML) and the response generator is adapted to encode the response message in XML.

21. The system for automating communications between service providers in connection with providing the high speed network access service of claim 14, wherein each predefined response and request document tag definition is associated with a message document header tag definition, corresponding one of a request and response message header tag definition and a message body tag definition.

22. The system for automating communications between service providers in connection with providing the high speed network access service of claim 21, wherein the corresponding one of a request and response message header tag definition is associated with a predefined sender tag definition and a recipient tag definition.

23. The system for automating communications between service providers in connection with providing the high speed network access service of claim 21, wherein the message body tag definition is associated with a type tag definition having a corresponding one of a sub-request and a sub-response tag definition.

24. A computer program product, stored on a storage medium, the computer program product to automate communications between service providers in connection with providing a high speed network access service, comprising:
   computer code that receives a request message relating to the high speed network access service, the high speed network access service comprises digital subscriber line technology, from a first service provider by a second service provider of the high speed network access service via a network, the first and second service providers cooperating to provide high speed network access service to an end subscriber, the cooperating includes passing high speed network data destined to or originating from the end subscriber, the first and second service providers respectively is one from a group consisting of: (i) a competitive local exchange carrier (CLEC) and an incumbent local exchange carrier (ILEC); (ii) an ILEC and a CLEC; (iii) an internet service provider (ISP) and a CLEC; or (iv) a CLEC and an ISP;
   computer code of the second service provider that processes the request message from the first service provider automatically upon the receiving using a computer system to automatically generate a response message to the request message by the second service provider, wherein the computer code of the second service provider that processes the request message utilizes a predefined request document tag definition and the computer code of the second service provider that generates the response message utilizes a predefined response document tag definition; and
   computer code that transmits the response message from the second service provider to the first service provider via the network automatically upon completion of the processing.

25. The computer program product that automates communications between service providers in connection with providing a high speed network access service of claim 24, wherein the computer code that processes the request message determines a type with which the request message is associated, the type is selected from the group consisting of service availability, DSL service, order entry, order status, order summary, trouble ticket entry, trouble ticket status, and trouble ticket summary.

26. The computer program product that automates communications between service providers in connection with providing a high speed network access service of claim 25, wherein the computer code that processes the request message utilizes the predefined request document tag definition corresponding to the request message type.

27. The computer program product that automates communications between service providers in connection with providing a high speed network access service of claim 25, wherein the computer code that generates the response message generates the response message in conformity to the predefined response document tag definition corresponding to the response message type and associates the response message with the request message type.

28. The computer program product that automates communications between service providers in connection with providing a high speed network access service of claim 25, wherein the computer code that processes the request message includes determining from the request message values for request parameters corresponding to the message type.

29. The computer program product that automates communications between service providers in connection with providing a high speed network access service of claim 28, wherein the computer code that generates the response message includes associating the response message with said message type and incorporating into the response message values for response parameters corresponding to said message type.

30. The computer program product that automates communications between service providers in connection with providing a high speed network access service of claim 24, wherein the computer code that generates the response message encodes the response message in extensible markup language (XML).

31. The computer program product that automates communications between service providers in connection with providing a high speed network access service of claim 24, wherein each predefined response and request document tag definition is associated with a message document header tag definition, corresponding one of a request and response message header tag definition and a message body tag definition.

32. The computer program product that automates communications between service providers in connection with providing a high speed network access service of claim 31, wherein the corresponding one of a request and response message header tag definition is associated with a predefined sender tag definition and a recipient tag definition.

33. The computer program product that automates communications between service providers in connection with providing a high speed network access service of claim 31, wherein the message body tag definition is associated with a type tag definition having a corresponding one of a sub-request and a sub-response tag definition.

* * * * *